United States Patent

[11] 3,603,655

| [72] | Inventors | Thomas C. Keller<br>Canton;<br>Louis H. Gegenheimer, Lakewood, both of, Ohio |
|---|---|---|
| [21] | Appl. No. | 862,801 |
| [22] | Filed | Oct. 1, 1969 |
| [45] | Patented | Sept. 7, 1971 |
| [73] | Assignee | The Timken Company<br>Canton, Ohio |

[54] BEARING ASSEMBLY
4 Claims, 4 Drawing Figs.

[52] U.S. Cl. .................................................. 308/180
[51] Int. Cl. ................................................ F16c 13/02

[50] Field of Search ......................................... 308/180,
207, 236, 189

[56] References Cited
UNITED STATES PATENTS

| 2,751,266 | 6/1956 | Palmgren et al. ............ | 308/180 |
| 3,268,278 | 8/1966 | Purdy .......................... | 308/180 |

*Primary Examiner*—Martin P. Schwadron
*Assistant Examiner*—Frank Susko
*Attorney*—Gravely, Lieder & Woodruff ABSTRACT: A bearing assembly has an end cap which is recessed into the outboard wear ring thereof so that the axial projection on the end cap is minimized.

PATENTED SEP 7 1971

INVENTORS
THOMAS C. KELLER
LOUIS H. GEGENHEIMER
BY *Gravely, Lieder & Woodruff*
ATTORNEYS

BEARING ASSEMBLY

BACKGROUND OF THE INVENTION

This invention relates in general to bearing assemblies and more particularly to end caps for bearing assemblies.

So-called all purpose bearing assemblies find a wide variety of applications and are used quite extensively as journals for the wheel axles on rail cars. These bearing assemblies have end caps which project considerably beyond the roller bearings through which the actual journal is effected, and while this relatively large amount of lateral projection does not create any clearance problems in railroad service, it does in more specialized applications. For example, many industrial cranes run on track s positioned very close to walls. Accordingly, the lateral projection of the bearing assemblies beyond the tracks must be minimal to avoid interference with the walls. Similarly, mine tunnels present clearance problems for mine cars, and with many mine cars these clearance problems exist at the bearing assemblies. Aside from rail cars and similar applications, the compactness of some machinery of current manufacture affords only small spaces for the axial projection of bearing assemblies beyond pillow blocks and other structures in which those bearing assemblies may be mounted.

SUMMARY OF THE INVENTION

One of the principal objects of the present invention is to provide a bearing assembly in which the end cap projects only a very short distance beyond the roller bearings through which the actual journal is effected. Another object is to provide a bearing assembly which is extremely compact and can be employed with shorter axles. A further object is to provide a compact end cap suitable for use with conventional all purpose bearing assemblies. Yet another object is to provide an end cap, a considerably portion of which is recessed into the outboard wear ring of the bearing assembly. An additional object is to provide an end cap which possesses sufficient strength to withstand the clamping forces exerted by the screws which hold it in place without deflecting excessively. Another object is to provide an end cap which is simple in construction and easy to manufacture. These and other objects and advantages will become apparent hereinafter.

The present invention is embodied in a bearing assembly having an end cap which is contained partially within a sleevelike element projecting beyond a shaft journaled by the bearing assembly. The sleevelike element extends outwardly from a bearing in which the shaft is journaled. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur.

DETAILED DESCRIPTION OF THE INVENTION

Figure 1:
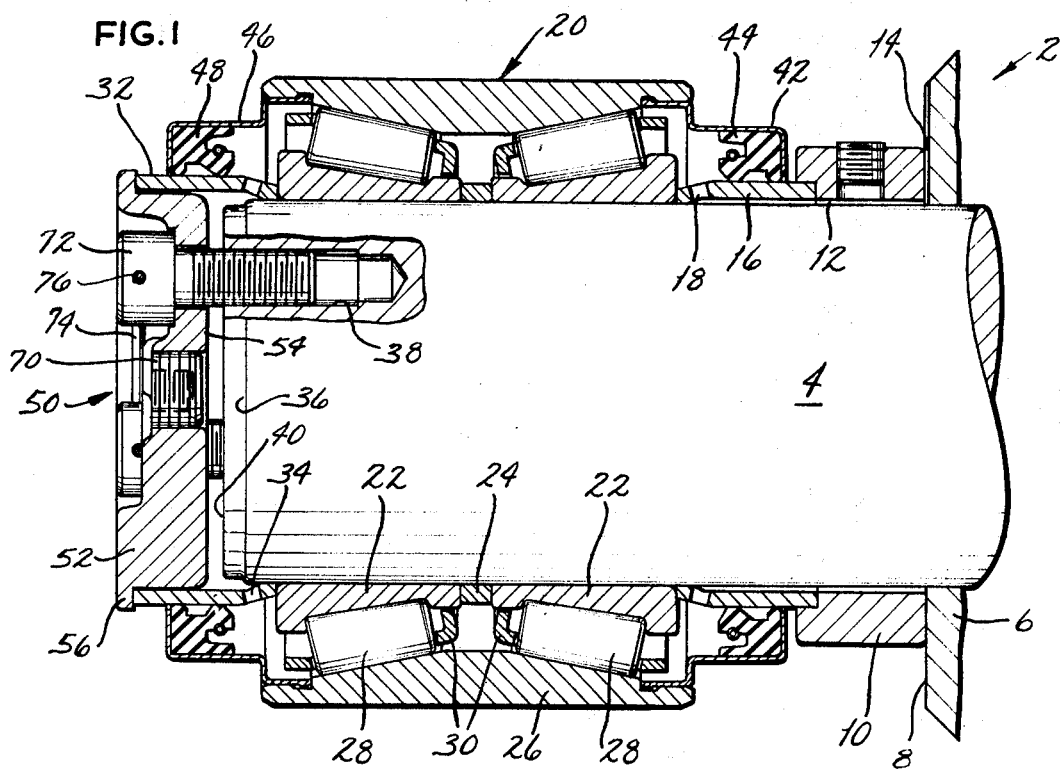
FIG. 1 is a longitudinal sectional view of a bearing assembly constructed in accordance with and embodying the present invention.
Figure 2:
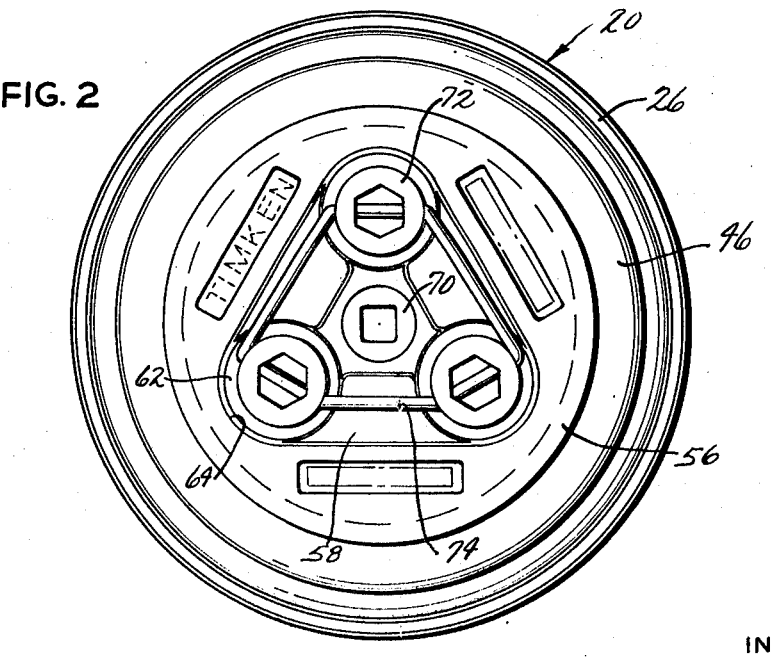
FIG. 2 is an end elevational view of the bearing assembly.
Figure 3:
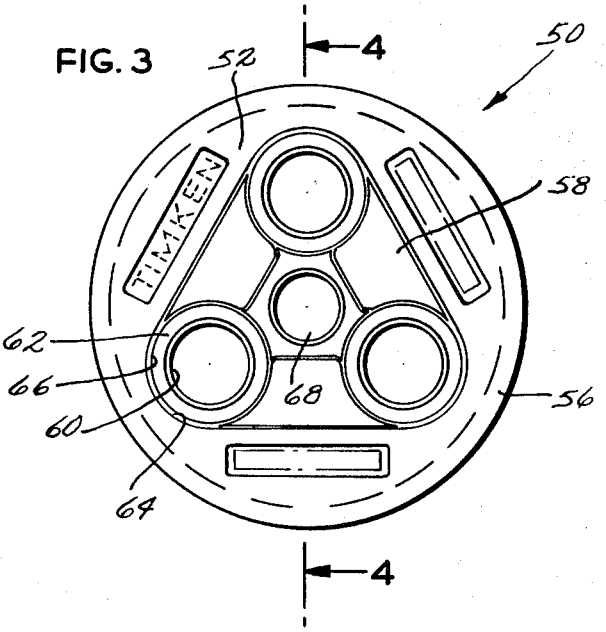
FIG. 3 is an end elevational view of the end cap, the cap screws for securing being removed.
Figure 4:
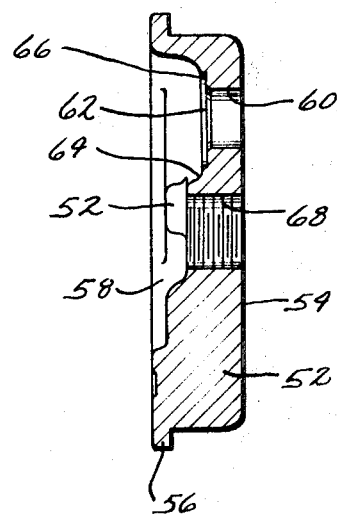
FIG. 4 is a sectional view of the end cap taken along line 4—4 of FIG. 3.

Referring now to the drawings, 2 designates a bearing assembly for journaling an axle or a shaft 4 (FIG. 1) in a mounting structure (not shown) such as a pillow block or the side frame of a rail car truck. Inwardly at a predetermined distance from its end the shaft 4 is provided with an outwardly extending abutment 8 such as a collar or flange for axially positioning the bearing assembly 2.

The bearing assembly 2 includes a backing or spacer ring 10 which fits over the shaft 4 and against the abutment 8. The internal diameter of the backing ring 10 is slightly greater than the diameter of the shaft 8 so that an annular channel 12 exists between the two, and this channel 12 is vented through a radial slot 14 cut into the abutment 8. The outer end of the backing ring 10 is counterbored for snug reception of an inboard wear ring 16 which for the main part is also set away from the shaft 4 to form a continuation of the channel 12. The outer end of the wear ring 16 snugly embraces the shaft 4, and slightly beyond the annular area of contact the wear ring 16 is provided with apertures 18 which communicate with the channel 12.

The reduced end of the inboard wear ring 16 abuts against a tapered roller bearing 20 including a pair of cones 22 fitted over the shaft 4 and separated by a cone spacer 24 through which the shaft 4 also extends. The bearing 20 also includes a double cup 26 which encircles the cones 22 and furthermore fits into the mounting structure 6. Interposed in the annular space between the tapered raceways on the cones 22 and the cup 26 are a plurality of tapered rollers 28 which are circumferentially spaced from one another in cages 30.

The shaft 4 projects only slightly beyond the outermost cone 22, and this portion of the shaft 4 is embraced by the reduced end of an outboard wear ring 32 which is identical in construction to the inboard wear ring 16, but is reversed in position. Thus, the wear ring 32 flares outwardly slightly beyond its annular area of engagement with the shaft 4, and just beyond that area it is provided with apertures 34.

At the apertures 34 the shaft 4 merges into a reduced and beveled end portion 36 which terminates slightly beyond the apertures 34. Accordingly, a considerable portion of the wear ring 32 projects axially beyond the end of the shaft 4, in contrast to conventional bearing assemblies in which at least the reduced end portion on the shaft projects beyond the outboard wear ring. The end of the shaft is furthermore provided with three threaded bores 38 which are equally spaced from one another and extend axially inwardly from the circular end face 40 of the end portion 36.

Press fitted into the inner end of the double cup 26 is an inboard seal case 42 which projects outwardly around a substantial portion of the inboard wear ring 16 where a circumferential lip-type seal 44 is bonded to it. The lips of the seal 44 bear against the outwardly presented cylindrical surface of the wear ring 16 beyond the apertures 18, forming a seal therewith. Similarly the outer end of the cut 26 receives and retains an outboard seal case 46 having a circumferential lip-type seal 48 bonded to it. The lips of the seal 48 engage the cylindrical wear surface of the outboard wear ring 32 beyond the apertures 34 thereon. The seals 44 and 48 are formed from an elastomeric substance and retain lubricants within the interior of the bearings 20. They further prevent contaminants from entering the bearing 20.

Other than the disposition of the end of the shaft 4 within the outboard wear ring 32, the foregoing bearing construction, insofar as the description extends, is conventional to many bearing assemblies of current manufacture. These conventional bearing assemblies also have end caps which not only extend inwardly and circumscribe portions of their outboard wear rings and seal cases, but also extend outwardly a considerable distance beyond their outboard wear rings. By reason of the extension of conventional end caps beyond the outboard wear rings against which they bear the axial length and lateral projection of conventional bearing assemblies is considerable. This extension in many applications creates clearance problems.

The bearing assembly 2, however, is provided with an end cap 50 which for the most part is recessed within the outboard wear ring 32 beyond the end face 40 of the shaft 4, and only a small portion of its projects axially beyond the wear ring 32. In particular, the end cap 50 includes a generally cylindrical body 52 which is sized to fit snugly within the outboard wear ring 32. The body 52 inwardly terminates at a planar and generally continuous end face 54, and at its opposite end it merges into an integrally formed annular flange 56 or restraining lip which projects outwardly past and abuts against the outer end face of the outboard wear ring 32. The spacing between flange 56 and the end face 54, or in other words the depth of the cylindrical portion of the body 52, is such that when the flange 56 abuts the wear ring 32 a small clearance space will exist between the end face 54 of the end cap 50 and the end face 40 of the shaft 4.

The body 52 is provided with a triangular recess 58 which opens outwardly and has arcuate corners. Inwardly from each arcuate corner of the recess 58 a bolt hole 60 extends axially through the body 52, and these holes 60 register with the threaded bores 38 in the shaft 4. The holes 60 open outwardly into the triangular recess 58 through shall counterbores 62 and circular recesses or depressions 64, and the counterbores 62 inwardly terminate at circular seating faces 66. The body 52 is further provided with a threaded relubrication hole 68 which extends completely through it and opens into the triangular recess 58 in the center of the pattern established by the bolt holes 60. The relubrication hole 68 receives a pipe plug 70 which normally blocks it.

The end cap 50 is secured to the shaft 4 by three cap screws 72 which extend through the bolt holes 60 and thread into the threaded bores 38 of the shaft 4. In larger bearing assemblies 2 the cap screws 72 have hexagonal heads, whereas in smaller versions the cap screws 72 have socket heads. In any event, the combined depth of the triangular and circular recesses 58 and 64 and the counterbores 62, is sufficient to completely receive the heads of the screws 72. As the screws 72 are advanced into their bores 38 their heads bear against the circular seating faces 66 at the ends of the counterbores 62 and draw the end cap 50 toward the circular end face 40 on the shaft 4. In time the flange 56 on the end cap 50 seats tightly against the annular end face of the outboard wear ring 32, and the compressive force exerted thereby is transmitted through the outboard wear ring 32, cones 22, cone spacer 24, inboard wear ring 16 and backing ring 10 to the abutment 8. Thus, the bolts 72 acting through the end cap 50 clamp the foregoing components tightly together on the end of the shaft 4. Once the bolts 72 have been tightened to the proper degree, a soft iron restraining wire 74 is passed through transversely extending holes 76 in the heads of the bolts 72 to prevent them from working out of the bores 38.

The end cap 50 is preferably forged from SAE 1060 steel or a material of equivalent or better physical properties. Slow cooling is utilized to permit machinability by commercial means and this method provides adequate physical properties for strength required. Preferably the steel is forged at between 2050° F. and 2250° F. Immediately after the forging it possesses a temperature within the foregoing range. Thereafter is is trimmed and cooled gradually over a period of 4 to 6 hours. By using this method, additional heat treatment such as quench and temper is avoided. Also, annealing operations are not necessary for machinability, which would be required if forged parts were merely air-cooled. The end cap 50 is then machined in critical areas to the proper dimensions.

An actual end cap 50 constructed in accordance with the foregoing specifications did not deflect appreciably when the cap screws 72 were tightened against them and consequently the plugs 70 in them could be removed without great difficulty for relubricating the bearing 20. Since the the end cap 50 projects beyond the outboard wear ring 32 only by a distance equal to the thickness of its flange 56, bearing assemblies 2 provided with end caps 50 are ideally suited for use in applications where lateral clearance problems exist. Moreover, shorter axles are utilized with bearing assemblies 2 having recessed end caps 50.

This invention is intended to cover all changes and modifications of the example of the invention herein chosen for purposes of the disclosure which doe not constitute departures from the spirit and scope of the invention.

What is claimed is:

1. A compact bearing assembly having a shaft with an abutment set inwardly from its end; said bearing assembly comprising a bearing including inner and outer races capable of rotating relative to each other, the inner race encircling the shaft and being prevented from moving axially inwardly on the shaft by the abutment, the inner race having its outer end positioned inwardly from the outer end of the shaft so that the shaft projects beyond the inner race, the outer race encircling the inner race and being rotatable relative to the shaft; a wear ring engaged with and encircling the portion of the shaft which projects outwardly beyond the outer end of the inner race so that the wear ring is positioned by the shaft concentric to the shaft axis, the wear ring projecting outwardly beyond the outer end of the shaft so that the shaft terminates within the wear ring; a seal fixed relative to outer race and embracing the outwardly presented surface of the wear ring; an end cap including a substantially cylindrical body portion fitted within the wear ring and a flange formed integral with the body portion and projecting radially outwardly therefrom and engaged with the outer end of the wear ring so that the flange axially positions the end cap in the wear ring; the end cap at its flange forming one axial end of the bearing assembly and having a recess which opens axially outwardly and is encircled by the flange; and bolts extending axially through the body portion of the end cap and threaded into the shaft, the bolts having heads which are disposed in the outwardly opening recess and bear against the body portion so as to urge the flange on the end cap tightly against the wear ring, whereby the wear ring and inner race of the bearing are compressed between the end cap flange and the abutment, the heads of the bolts being contained substantially entirely within the recess so that they do not project axially outwardly from the end cap.

2. In a compact bearing assembly which includes: a bearing having an inner race encircling a shaft and blocked against movement inwardly on the shaft and an outer race encircling the inner race and rotatable relative thereto, ring means encircling the shaft and projecting axially outwardly beyond the outer end face of the shaft, a seal fixed relative to the outer race and embracing the outer surface of the ring means, and bolts threaded axially into the shaft and having heads located beyond the end face of the shaft; the improvement which resides in an end cap forming the outermost end of the bearing assembly and comprising a cylindrical body portion fitted into the portion of the ring means projecting beyond the shaft end face, a flange formed integral with the body portion and projecting radially outwardly from the cylindrical body portion, the flange being positioned opposite to the end of the ring means, and a recess formed in the body portion radially inwardly from the flange and extending axially inwardly into the body portion beyond the face of the flange which is positioned opposite to the end of the ring means, the recess opening axially outwardly and receiving the heads of the bolts so that when the bolts are tightened the heads thereof bear against the body portion of the end cap, whereby the flange forces the ring means toward the bearing and prevents the ring means and bearing from leaving the end of the shaft, the recess being deep enough to accommodate each bolt head substantially in its entirety so that the bolt heads do not project axially beyond the end cap.

3. A bearing assembly according to claim 1 and further characterized by another wear ring on the opposite side of the bearing and a backing ring interposed between the other wear ring and the abutment on the shaft.

4. The structure according to claim 1 wherein the body portion and the annular flange are hot forged as an integral unit from steel and are allowed to cool slowly thereafter.